Sept. 30, 1930. W. F. WILLIAMS 1,777,240
DIRECTION INDICATOR FOR MOTOR VEHICLES
Filed July 29, 1929
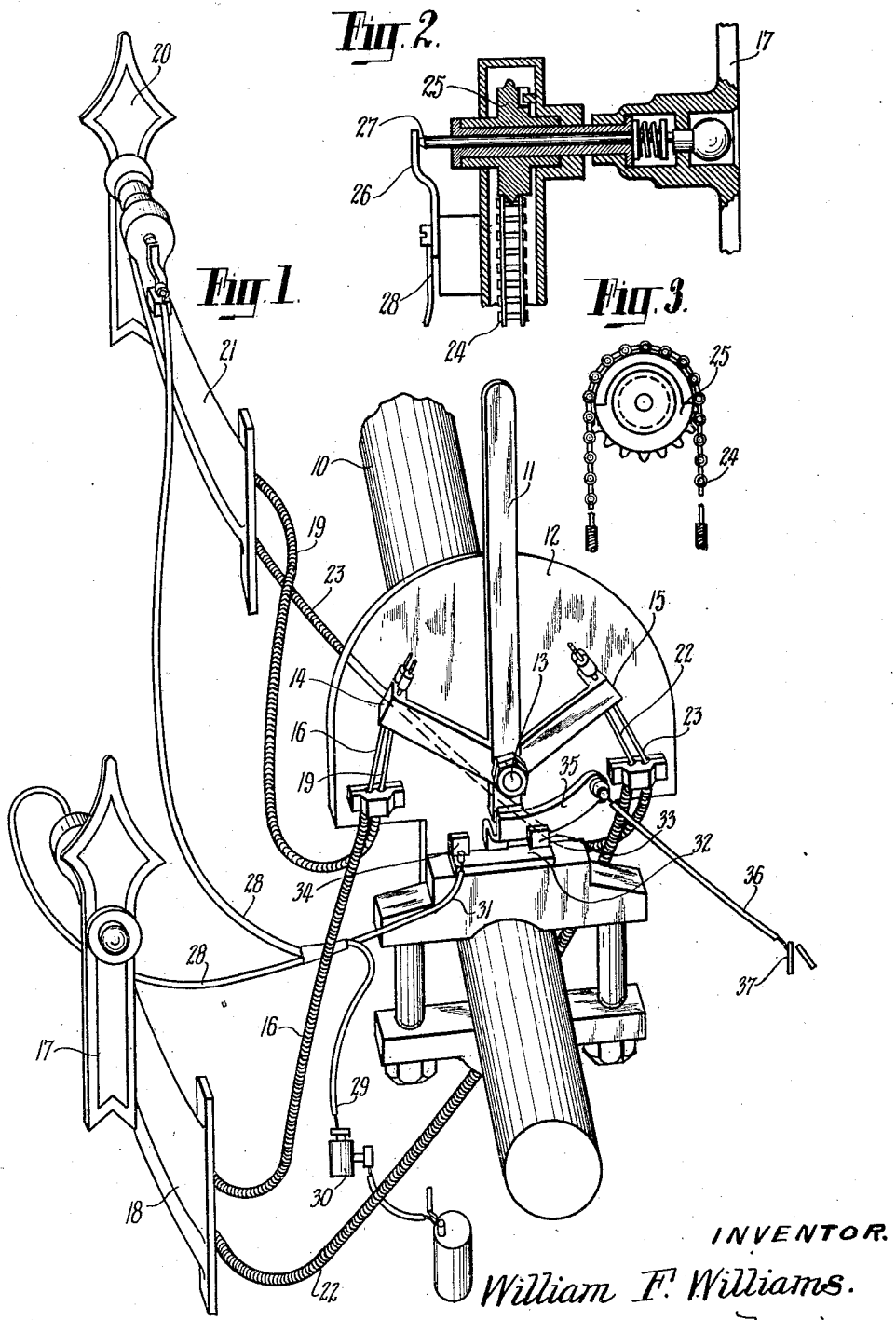
INVENTOR.
William F. Williams.
By Marion + Marion
Attorneys.

Patented Sept. 30, 1930

1,777,240

UNITED STATES PATENT OFFICE

WILLIAM FERRIOR WILLIAMS, OF MOUNT LAWLEY, AUSTRALIA

DIRECTION INDICATOR FOR MOTOR VEHICLES

Application filed July 29, 1929, Serial No. 381,900, and in Australia April 17, 1929.

This invention relates to an improved direction indicator for motor vehicles.

Many suggestions have been made in regard to direction indicators for motor vehicles. It is considered that they have either been incomplete as far as the necessary functions are concerned, or else too complicated in operation.

The present invention relates to a direction indicator which permits all the necessary signals to be given although the apparatus is comparatively simple in construction.

The invention resides in certain combination of parts as defined in the claiming clauses at the end hereof.

The invention will readily be understood by reference to the accompanying drawings, in which:—

Figure 1 is a perspective view thereof in which parts of the motor vehicle non-essential to the operation of the apparatus have been omitted for the sake of clearness.

Fig. 2 is a side sectional elevation of the various parts operating an indicating arrow, and Fig. 3 is a front elevation of the sprocket operating to turn an arrow and its appurtenant parts.

Referring to the drawings, 10 indicates the steering column, 11 the signal control lever, and 12 a stationary plate to which the said lever is pivoted towards its lower end at 13. Connected to the lever 11 are right- and left-hand inclined extensions 14 and 15, each of which is connected to the ends of two Bowden wires subsequently referred to. The Bowden wire 16 is connected so as to operate a front indicating arrow 17 supported from the body by means of a bracket 18. The other Bowden wire 19 is connected so as to operate the rear indicating arrow 20 connected to the body by means of a bracket 21. On the other side, the Bowden wire 22 is connected so as to operate the front indicating arrow in a direction opposite to that which is operated by the Bowden wire 16, whilst the Bowden wire 23 is connected so as to operate the rear indicating arrow in a direction opposite to that which is operated by the Bowden wire 19.

There is in connection with the operation of each indicating arm or arrow a chain 24 surrounding a sprocket 25. The said sprocket is placed in operative communication with the corresponding indicating arrow. To each end of the chain 24, whether back or front, is connected the end of the corresponding Bowden wire. When, therefore, one Bowden wire is operated, the effect is that the sprocket and therefore the arrow is turned in one direction, whilst when the other Bowden wire is operated, the reverse effect is obtained. Adjacent to the rear of the indicating arrow is a contact 26 bearing against the spindle 27 insulated and connected to an electric lamp in the interior of the arrow, which it is capable of illuminating when lit. To each of the contacts 26 is connected a lead 28 that is connected to two leads, one, 29, passing to a switch 30 operated by the foot brake, and the other, 31, passing to a contact 32 insulated and supported adjacent to the lower end of the operating lever 11. The said contact has left and right upstanding extensions 33 and 34. Connected to but insulated from the lever 11 is a conducting extension 35 having a downward extension that, when the operating lever 11 is moved either to the right or to the left, results in such extension contacting with the right or left-hand upward extension 34 or 33 of the contact strip 32. There is a lead 36 from the contact member 35 to the lighting switch 37, so that the lead 36 is only live when the lights are on.

The apparatus functions as follows.

Consider day-time operation. When driving is commenced, the operating lever 11 will be in the vertical position shown in Fig. 1. On being about to turn to the right, the driver moves such lever over towards the right. This has the effect of exerting a pull on the Bowden wires 22 and 23 and correspondingly releasing the Bowden wires 16 and 19. By reason of the manner that these wires are connected to the chain 24 operating the sprocket 25 on both the front and the rear indicating arrows, the effect is that each arrow is turned towards the direction desired, that is, towards the right. When the turn has been completed, the driver replaces the operating lever 11 to the vertical position. When about to turn to the left, the operation is similar, except that opposite Bowden wires are pulled and relaxed, and that the arrows are obviously turned in the opposite direction.

When driving at night-time, the lighting switch 37 will make the wire 36 live, with the result that on turning to the right or to the left, not only are the arrows turned in such direction, but as contacts are made against the upstanding contacts 34 and 33, the result is that each arrow is illuminated on such action. In addition, when the foot brake is applied, whether in the daytime or at night-time, the lead 29 connected to the foot brake switch becomes live, with the result that the arrow will be illuminated when it is in an upright position and will therefore function to indicate an intention to stop.

I claim:

1. A direction indicator comprising a movable indicating arm, a sprocket rigid with said arm, a length of chain engaging said sprocket, a Bowden wire connected at one end to one of the extremities of said chain, another Bowden wire connected at one end to the other extremity of said chain, and an operable pivoted lever having a pair of angular extensions each disposed on opposite sides thereof, one of said extensions engaging the free end of one of said Bowden wires and the other extension engaging the free end of the remaining Bowden wire whereby with movement of the lever one Bowden wire will be pulled while the other will be relaxed, causing said indicator arm to move in unison with the lever.

2. A direction indicator comprising a substantially vertical support, a movable indicating arm normally paralleling said support and having a right angularly disposed shaft mounted transversely of the support for rotation therein, a sprocket rigid with said arm shaft and arranged coaxially therewith, a length of chain engaged over said sprocket and having its end portions depending to the right and left of said indicating arm, a first Bowden wire connected at one end to that end portion of the chain depending to the right of the indicating arm, a second Bowden wire connected at one end to that end portion of the chain depending to the left of the indicating arm, and a manually displaceable lever normally disposed in a vertical position and provided with an angular extension upon its right side in connection with said first Bowden wire and with a similar extension upon its left side in connection with said second Bowden wire, whereby with movement of the lever, one Bowden wire will be pulled while the other Bowden wire will be relaxed causing said indicating arm to follow the dispacement of said lever.

Dated this 20th day of June, 1929.

WILLIAM FERRIOR WILLIAMS.